US009308811B2

(12) United States Patent
Boeer et al.

(10) Patent No.: US 9,308,811 B2
(45) Date of Patent: Apr. 12, 2016

(54) DRIVE DEVICE FOR MOTOR VEHICLES

(71) Applicant: GOLDHOFER AKTIENGESELLSCHAFT, Memmingen (DE)

(72) Inventors: Thomas Boeer, Ungerhausen (DE); Armin Baader, Erkheim (DE)

(73) Assignee: GOLDHOFER AKTIENGESELLSCHAFT, Memmingen (DE)

( * ) Notice: Subject to any disclaimer, the term of this patent is extended or adjusted under 35 U.S.C. 154(b) by 0 days.

(21) Appl. No.: 14/400,248

(22) PCT Filed: May 10, 2013

(86) PCT No.: PCT/EP2013/001386
§ 371 (c)(1),
(2) Date: Nov. 10, 2014

(87) PCT Pub. No.: WO2013/167279
PCT Pub. Date: Nov. 14, 2013

(65) Prior Publication Data
US 2015/0123452 A1    May 7, 2015

(30) Foreign Application Priority Data
May 10, 2012 (DE) .......................... 10 2012 009 199

(51) Int. Cl.
*B60K 7/00* (2006.01)
*B60K 17/04* (2006.01)
*F16D 27/00* (2006.01)

(52) U.S. Cl.
CPC ............. *B60K 7/0007* (2013.01); *B60K 17/046* (2013.01); *F16D 27/00* (2013.01); *B60K 2007/0038* (2013.01); *B60K 2007/0092* (2013.01); *B60Y 2200/44* (2013.01)

(58) Field of Classification Search
CPC ........... B60K 7/0007; B60K 2007/003; B60K 2007/0038; B60K 2007/0046; B60K 2007/0092
USPC ...................................................... 180/65.51
See application file for complete search history.

(56) References Cited

U.S. PATENT DOCUMENTS 4,330,045 A * 5/1982 Myers ........................ 180/65.51
6,328,123 B1 * 12/2001 Niemann et al. ........... 180/65.51
(Continued)

FOREIGN PATENT DOCUMENTS

DE    2127410     12/1972
DE    10121372    11/2002
(Continued)

OTHER PUBLICATIONS

International Search Report for PCT/EP2013/001386, English translation attached to original, Both completed by the European Patent Office on Jul. 30, 2013, All together 7 Pages.

*Primary Examiner* — Jeffrey J Restifo
*Assistant Examiner* — Erez Gurari
(74) *Attorney, Agent, or Firm* — Brooks Kushman P.C.

(57) ABSTRACT

A drive device for motor vehicles including one or more electric motors, each of which is associated with at least one drive wheel rotatable on a steering knuckle and drives the wheel via a step-down gearbox. The gearbox is installed in the wheel hub of the respective drive wheel and a disconnect device for coupling and decoupling the respective electric motor from the respective gearbox is provided. The steering knuckle is formed as an axle tube in which a drive shaft is rotatably mounted, the drive shaft being able to be brought into a driving connection to the rotor of the electric motor at the inner end of the shaft and to the input of the gearbox at the outer end of the shaft when it is to perform driving.

5 Claims, 3 Drawing Sheets

(56) References Cited

U.S. PATENT DOCUMENTS

Figure 3:
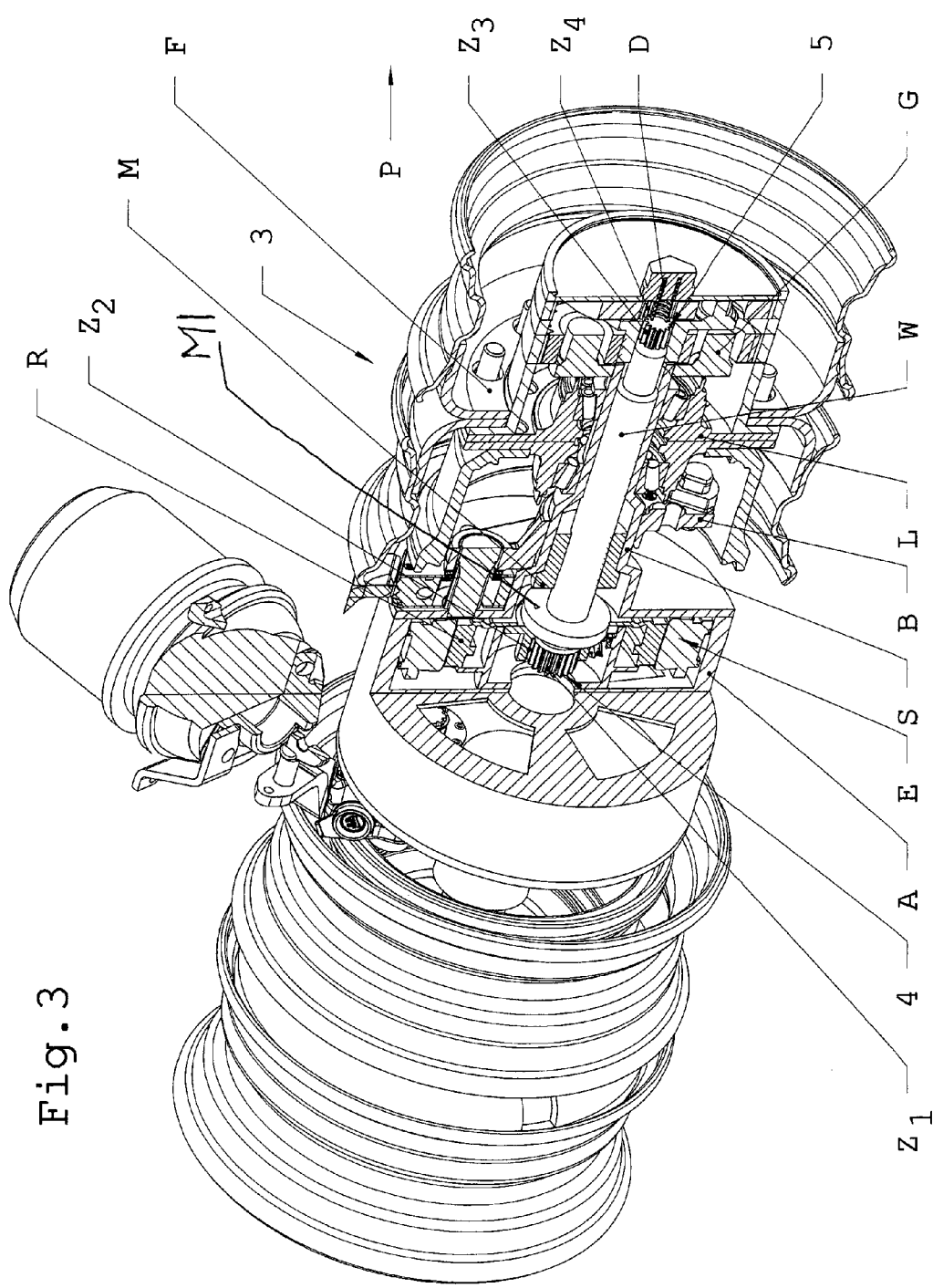

| | | |
|---|---|---|
| 2003/0047402 A1 | 3/2003 | Borgen et al. |
| 2004/0164505 A1 | 8/2004 | Clemens et al. |
| 2007/0181357 A1* | 8/2007 | Saito et al. .................. 180/65.5 |
| 2008/0017462 A1* | 1/2008 | Mizutani et al. ........... 188/266.1 |
| 2008/0070736 A1* | 3/2008 | Yoshino et al. ............... 475/149 |
| 2009/0093931 A1* | 4/2009 | Mizutani et al. ................ 701/42 |
| 2009/0133944 A1* | 5/2009 | Nishioka et al. ........... 180/65.51 |
| 2009/0236157 A1* | 9/2009 | Akamatsu ...................... 180/55 |
| 2009/0236158 A1* | 9/2009 | Sakuma et al. ............ 180/65.51 |
| 2009/0312134 A1* | 12/2009 | Schoon ......................... 475/154 |
| 2010/0000811 A1* | 1/2010 | Iwano ........................ 180/65.51 |
| 2010/0236848 A1* | 9/2010 | Loeber ...................... 180/65.51 |
| 2010/0326748 A1* | 12/2010 | Sgherri et al. .................. 180/55 |
| 2012/0018984 A1* | 1/2012 | Oriet ............................... 280/676 |
| 2012/0142475 A1* | 6/2012 | Shibukawa et al. ........... 475/159 |
| 2012/0190491 A1* | 7/2012 | Gunji et al. ....................... 475/5 |
| 2013/0199887 A1 | 8/2013 | Kassler et al. |
| 2014/0333120 A1* | 11/2014 | Pozzo ............................ 301/6.5 |
| 2014/0353054 A1* | 12/2014 | Matayoshi et al. ............ 180/55 |
| 2014/0374178 A1* | 12/2014 | Lee ........................... 180/65.51 |

FOREIGN PATENT DOCUMENTS

| | | |
|---|---|---|
| DE | 102011100060 | 11/2011 |
| EP | 1331127 | 7/2003 |
| EP | 2416027 | 2/2012 |

* cited by examiner

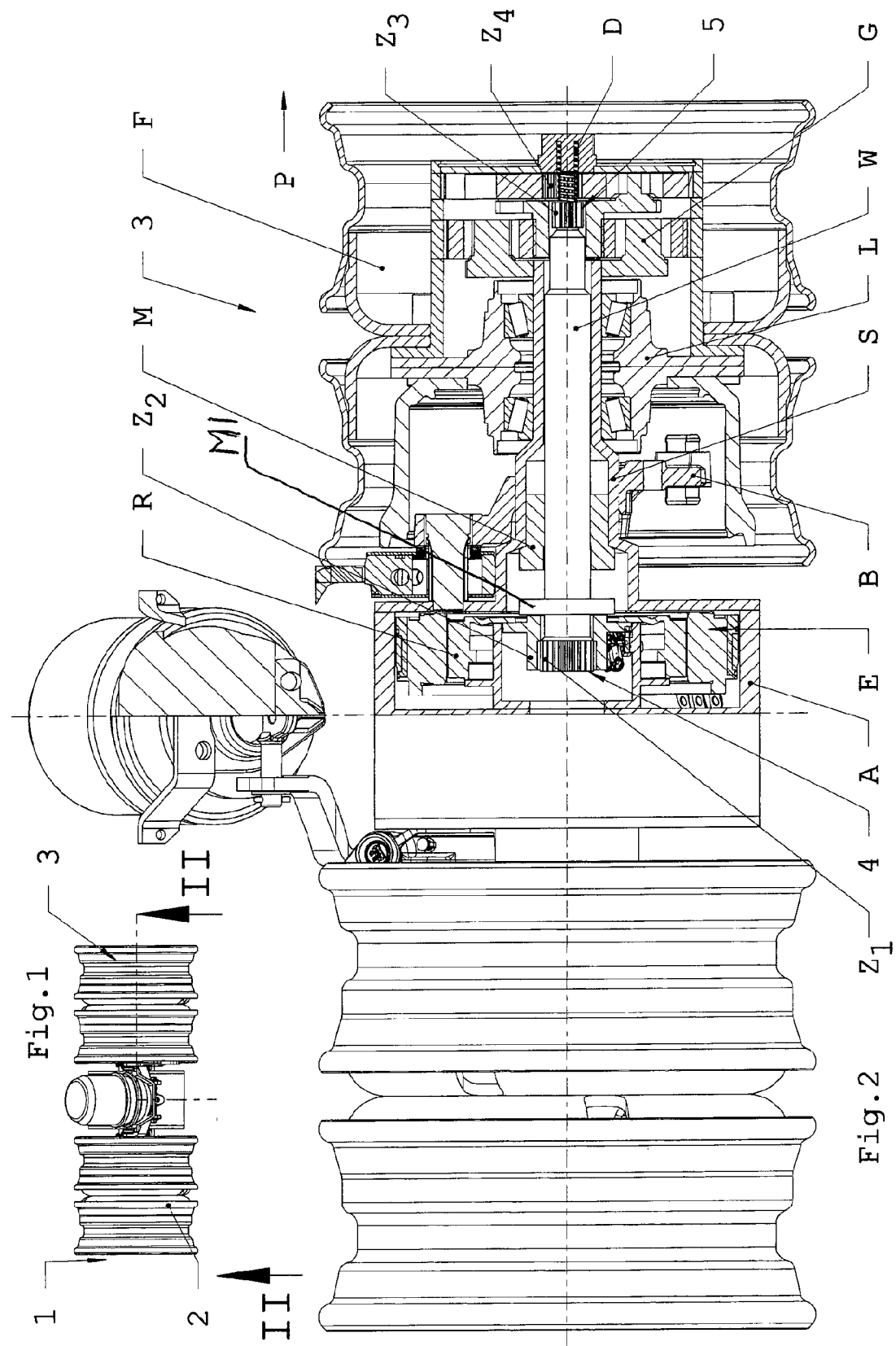

DRIVE DEVICE FOR MOTOR VEHICLES

CROSS-REFERENCE TO RELATED APPLICATION

This application is the U.S. national phase of PCT Application No. PCT/EP2013/001386 filed on May 10, 2013, which claims priority to DE Patent Application No. 10 2012 009 199.0 filed on May 10, 2012, the disclosures of which are incorporated in their entirety by reference herein.

The invention relates to a drive device for motor vehicles equipped with one or several electric motor(s), each assigned to at least one drive wheel rotating on a steering knuckle and driving it via a reduction gearbox, whereby the reduction gearbox is mounted in the wheel hub of the respective drive wheel and whereby a disconnect device is provided for coupling and decoupling the respective electric motor from the given gearbox.

Such a drive device is known from DE 101 21 372 A1. There, the disconnect device is an element between motor and gearbox operated manually from the outside, which in the event of an outage of the motor is to allow for a decoupling of the gearbox. Although an electric or pneumatic disconnect from inside the vehicle is said to be possible, no indication of realizing such a disconnect device is given.

In addition, DE 21 27 410 made known a drive device of this kind in which the steering knuckle is designed as an axle tube and the disconnect device is a friction clutch. Thus only a positively engaged force transmission between the electric motor and the driveshaft mounted inside the axle tube is provided.

This invention has the objective of designing a drive device of the kind described above in which the mentioned disconnect can not only be effected by the driver of the vehicle, less so at an outage of the motor than when it is necessary to tow the vehicle without its own drive at a higher speed than the electric-motor drive-device(s) is (are) laid out for. Because, the same could incur damage if they were forced to run at too high a speed since, as a rule, their rpm limit is only about 30 km/h. As a matter of fact, the drive connection is also to demonstrate a particularly high reliability and great longevity.

The invention achieves this objective with a device according to Patent Claim 1. Further developments of this device are the subject of the subordinate claims.

Thus, in the disengaged position the un-driven wheel can rotate at a higher rpm and the vehicle can be driven at a greater speed, or towed, than would be the case if the driveshaft were engaged and the rotor of the electric motor were to rotate along. In addition, the positively engaged force transmissions attain an especially high reliability and longevity of the device.

Advantageous for the positively engaged force transmission is that, on the motor side, a combination of, on the one hand, a first toothed end of the driveshaft and a ring gear with internal teeth of the electric-motor rotor is provided as the first ring gear with interior teeth and that, on the gearbox side, a combination of a second toothed end of the driveshaft and a ring gear with interior teeth of the reduction gearbox is provided as second ring gear with interior teeth.

Furthermore, in a preferred version of the invention, an electric magnet, coaxially adjoined to the electric motor, is used to move the driveshaft into the engaged position and hold it there. Also provided is a compression spring acting, on the gearbox side, on the end of the driveshaft to return the driveshaft to the disengaged position when the electric magnet is turned off. The compression spring has the necessary restoring force to return the driveshaft to the disengaged position when the electric magnet is turned off. This version has the advantage that in the case of an outage of the electric magnet the compression spring automatically brings the driveshaft to the disengaged position, which interrupts the drive connection.

The invention is explained in greater detail with reference to an example shown in the following figures.

Figure 4:
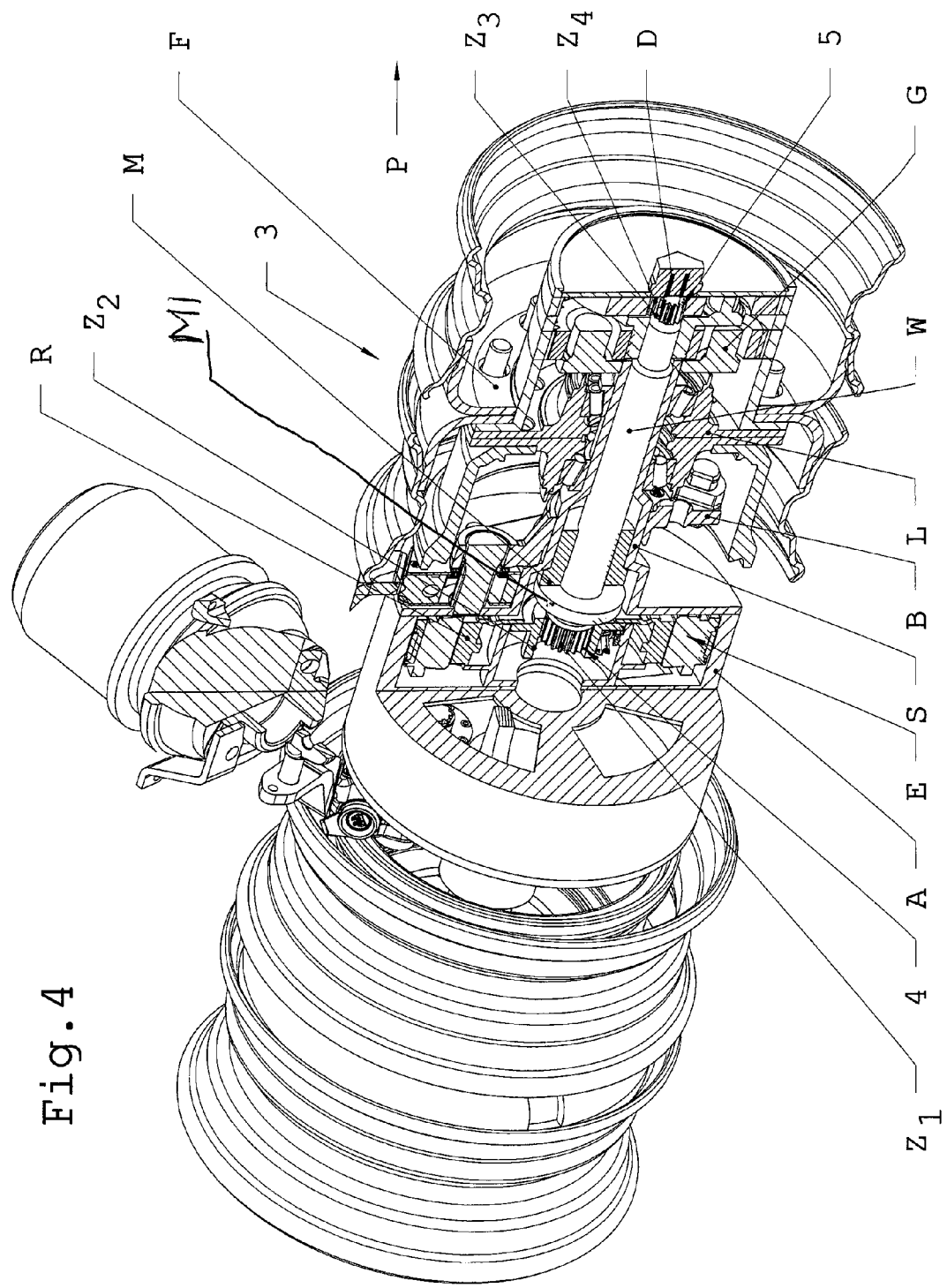

Shown is in:

FIG. 1: a plan view of an example of the invention in the form of a pendulum drive axle with two driven twin wheels;

FIG. 2: a section through the example of the invention along line II-II in FIG. 1 at an enlarged scale with the driveshaft in disengaged position;

FIG. 3: a graphic depiction of the section per FIG. 2;

FIG. 4: a graphic depiction of the section per FIG. 2 with the driveshaft in engaged position.

The respective motor vehicle, which may be equipped with a generator driven by a combustion engine but may also be only equipped with a battery or an accumulator, or with a connecting device to a stationary power source for charging the electric motor or electric motors, is not shown. As example of the invention is shown a pendulum drive axle, 1, with two driven twin wheels, 2 and 3; FIGS. 2 to 4 give sectional views of right twin wheel 3 in order to show the interior layout.

Twin wheel 3 rotates on a steering knuckle, S, and is driven by an electric motor, E, via a reduction gearbox, here a two-step planetary gear, G. Planetary gear G and a brake, B, are mounted inside the wheel hub of drive wheel 3. In addition, a disconnect device is provided that will be explained below.

Steering knuckle S is in the shape of an axle tube in which a driveshaft, W, is mounted in a rotating manner. Driveshaft W can be brought to a driving connection, namely at its inner end, 4, with a rotor, R, of electric motor E and at its outer end, 5, with the input of planetary gear G, whenever a propulsion is to occur. Driveshaft W can be displaced back and forth in axial direction from an engaged position in which a frictionally locking force transmission occurs between electric motor E and driveshaft W, on the one hand, and, on the other hand, between driveshaft W and planetary gear G, thus creating the mentioned driving connection, to a disengaged position in which the mentioned force transmission and hence the driving connection are cancelled, hereby also constituting a disconnect device.

FIGS. 2 and 3 depict the disengaged position in which driveshaft W is not engaged with both rotor R and planetary gear R (sic).

Advantageous for the positively engaged force transmission on the motor side is a combination of a first ring gear with external teeth, $Z_1$, at inner end 4 of driveshaft W and a first ring gear with internal teeth, $Z_2$, of rotor R of electric motor E as a first ring gear with internal teeth on the one hand, and, on the gearbox side, a combination of a second ring gear with external teeth, $Z_3$, at outer end 5 of driveshaft W and a ring gear with internal teeth, $Z_4$, of planetary gear G as second ring gear with internal teeth.

For the displacement to and the holding of the engagement position of driveshaft W in direction of arrow P the depicted example of the invention is provided with a turned-on electromagnet, M, coaxially adjoining electric motor E and also a compression spring, D, acting on the gearbox-side end of driveshaft W for the return of driveshaft W to the disengaged position when electromagnet M is turned off.

The layout is hereby such that, when turned on, electromagnet M coaxially surrounding driveshaft W can draw in a disk, M1, placed coaxially on driveshaft W and firmly connected with it, so that disk M1 rests against the opposite face of electromagnet M. This makes it possible that driveshaft W can be displaced in the direction of arrow P to its engagement position and be held there.

Disk M1 can also be in the form of a collar molded onto driveshaft W.

When the solenoid or electromagnet M is turned on, driveshaft W moves from its disengaged position depicted in FIGS. 2 and 3 in the direction of arrow P to the right into its engaged position depicted in FIG. 4, in which the two ring gear couples $Z_1$, $Z_2$ and $Z_3$, $Z_4$ are engaged with each other.

The invention claimed is:

1. A drive device for motor vehicles comprising at least one driving electric motor coordinated with at least one drive wheel rotatable respectively on a steering knuckle and driving a at least one drive wheel through a reduction gearbox, whereby the reduction gearbox is mounted in a wheel hub of the drive wheel, and a disconnect device for coupling and decoupling the respective the at least one electric motor from the gearbox wherein the steering knuckle is designed as an axle tube in which driveshaft is rotatably arranged and can be brought to a driving connection at its inner end with a rotor of the at least one electric motor and at an outer end with an input of a reduction gear when a propulsion is to occur, and wherein the driveshaft can be displaced back and forth in its axial direction between:
an engaged position, between electric motor and driveshaft, and between driveshaft and reduction gear so that a positive engagement force transmission is effected, establishing the driving connection, and
a disengaged position, in which the driving connection is disconnected.

2. The drive system as claimed in claim 1, wherein the positive engagement force transmission between the electric motor and the reduction gear is provided by,
on the motor side, a combination of a first gear with exterior teeth on an inner end of the driveshaft and a ring gear with interior teeth on the rotor of the electric motor and
on the reduction gear side, a second gear with exterior teeth on an outer end of the driveshaft engaging interior teeth of an input of a planetary gear set which forms the reduction gear.

3. The drive system as claimed in claim 1, wherein an electromagnet coaxially adjoining the electric motor is provided and turned on causing displacement of and holding of the driveshaft in the engaged position, and the return of driveshaft to the disengaged position, when the electric magnet is turned off, in response to a force from a compression spring acting on the gearbox-side end of the driveshaft.

4. The drive system as claimed in claim 3, wherein when under power, a disk, coaxially mounted on driveshaft and firmly connected to it, can be drawn in by electromagnet coaxially surrounding the driveshaft in such a manner that disk can rest against an opposite face of electromagnet which allows the displacement of the driveshaft to its engagement position where it can be held.

5. The drive system as claimed in claim 3, wherein the electromagnet coaxially adjoining the electric motor is provided and turned on for the displacement to and the holding of the driveshaft in the engaged position, and the return of the driveshaft to the disengaged position, when the electric motor is turned off, in response to a force from a compression spring acting on the gearbox-side end of the driveshaft.

\* \* \* \* \*

UNITED STATES PATENT AND TRADEMARK OFFICE
CERTIFICATE OF CORRECTION

PATENT NO.         : 9,308,811 B2
APPLICATION NO.    : 14/400248
DATED              : April 12, 2016
INVENTOR(S)        : Thomas Boeer et al.

Page 1 of 1

It is certified that error appears in the above-identified patent and that said Letters Patent is hereby corrected as shown below:

Claims

Column 3, Line 16, Claim 1:

After "steering knuckle and driving"
Delete "a" and
Insert -- an --.

Column 4, Line 19, Claim 4:

After "coaxially mounted on"
Insert -- a --.

Column 4, Line 23, Claim 4:

After "an opposite face of"
Insert -- the --.

Signed and Sealed this
Twenty-eighth Day of June, 2016

Michelle K. Lee
*Director of the United States Patent and Trademark Office*